(12) United States Patent
Mu

(10) Patent No.: US 12,557,069 B2
(45) Date of Patent: Feb. 17, 2026

(54) METHOD AND APPARATUS FOR TRANSMITTING PAGING CONTROL MESSAGE, AND COMMUNICATION DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 452 days.

(21) Appl. No.: 17/926,754

(22) PCT Filed: May 26, 2020

(86) PCT No.: PCT/CN2020/092303
§ 371 (c)(1),
(2) Date: Nov. 21, 2022

(87) PCT Pub. No.: WO2021/237445
PCT Pub. Date: Dec. 2, 2021

(65) Prior Publication Data
US 2023/0247584 A1    Aug. 3, 2023

(51) Int. Cl.
*H04W 68/02* (2009.01)
*H04W 68/00* (2009.01)

(52) U.S. Cl.
CPC ................... *H04W 68/02* (2013.01)

(58) Field of Classification Search
CPC ... H04W 68/02; H04W 68/005; H04W 68/00; H04L 5/0053; H04L 5/0094
USPC .......................................... 455/458
See application file for complete search history.

(56) References Cited

U.S. PATENT DOCUMENTS

| | | | |
|---|---|---|---|
| 9,148,748 B2 | 9/2015 | Wang et al. | |
| 2015/0131579 A1* | 5/2015 | Li | H04L 1/1858 370/329 |
| 2015/0245323 A1* | 8/2015 | You | H04L 5/0053 370/329 |
| 2015/0256403 A1* | 9/2015 | Li | H04L 41/0896 370/235 |
| 2015/0264665 A1* | 9/2015 | Vos | H04L 5/00 370/329 |

(Continued)

FOREIGN PATENT DOCUMENTS

| | | |
|---|---|---|
| CN | 110351815 A | 10/2019 |
| EP | 3041302 A1 | 7/2016 |

(Continued)

OTHER PUBLICATIONS

DCI on ShareTechnote. (Year: 2025).*

(Continued)

*Primary Examiner* — Mark G. Pannell
(74) *Attorney, Agent, or Firm* — Cozen O'Connor

(57) ABSTRACT

A method for transmitting a paging control message performed by a base station includes: transmitting a Physical Downlink Control Channel (PDCCH) signaling corresponding to a user equipment (UE) type of a UE based on the UE type. The PDCCH signaling carries a paging control message for the UE, different UE types correspond to different PDCCH signaling, and the paging control message is configured to indicate scheduling information of a paging message.

16 Claims, 5 Drawing Sheets

(56) References Cited

U.S. PATENT DOCUMENTS

| | | | | |
|---|---|---|---|---|
| 2015/0327155 | A1* | 11/2015 | Lee | H04W 76/14 |
| | | | | 370/329 |
| 2017/0280481 | A1* | 9/2017 | Stern-Berkowitz | |
| | | | | H04L 1/1854 |
| 2018/0115943 | A1* | 4/2018 | Park | H04W 74/0833 |
| 2018/0176881 | A1 | 6/2018 | Tirronen et al. | |
| 2021/0250930 | A1* | 8/2021 | Sakhnini | H04L 5/0053 |
| 2022/0279595 | A1* | 9/2022 | Jang | H04W 48/18 |
| 2022/0361122 | A1* | 11/2022 | Zheng | H04L 5/0091 |
| 2022/0394664 | A1* | 12/2022 | Xie | H04W 68/005 |
| 2023/0047726 | A1* | 2/2023 | Xu | H04W 72/20 |
| 2023/0299924 | A1* | 9/2023 | Mozaffari | H04L 5/0053 |
| | | | | 370/329 |

FOREIGN PATENT DOCUMENTS

| | | |
|---|---|---|
| EP | 3043607 A1 | 7/2016 |
| WO | WO 2015042862 A1 | 4/2015 |
| WO | WO 2018144873 A1 | 8/2018 |
| WO | WO 2020055102 A1 | 3/2020 |

OTHER PUBLICATIONS

European Patent Application No. 20938102.9, Search and Opinion dated Jan. 26, 2024, 18 pages.
Huawei et al. "Other aspects for reduced capability devices" 3GPP TSG RAN WG1 Meeting #101e, R1-2004612, May-Jun. 2020, 6 pages.
PCT/CN2020/092303 International Search Report dated Feb. 25, 2021; 2 pages.

* cited by examiner

METHOD AND APPARATUS FOR TRANSMITTING PAGING CONTROL MESSAGE, AND COMMUNICATION DEVICE

CROSS-REFERENCE TO RELATED APPLICATION

This application is a U.S. national phase application of International Application No. PCT/CN2020/092303, filed on May 26, 2020, the content of which is hereby incorporated by reference in its entirety for all purposes.

TECHNICAL FIELD

The disclosure relates to, but is not limited to, a field of wireless communication technologies, and more particularly, to methods and apparatuses for transmitting a paging control message, and communication devices.

BACKGROUND

In the fourth generation (4G) cellular mobile communication system, in order to support communications between devices which have become known as the Internet of Things (IoT), two technologies, Machine Type Communication (MTC) and Narrow Band Internet of Things (NB-IoT), have been proposed. These two technologies are mainly aimed at low-speed and high-latency scenarios, such as meter reading, environmental monitoring and other scenarios. At present, NB-IoT can only support a maximum rate of several hundred kbps, and MTC can only support a maximum rate of a few Mbps. However, on the other hand, IoT services continuously being expanded, for example video surveillance, smart home, wearable devices, and industrial sensing and monitoring services have become popular. These services usually require rates of tens to 100 Mbps, and also have relatively high requirements for avoiding delay. Therefore, MTC and NB-IoT technologies in LTE have difficulty meeting the requirements.

In the New Radio (NR), of fifth generation (5G) cellular mobile communication system, a new type of user equipment (UE) has been used to cover the requirements of such mid-range IoT devices. This new type of UE is called Reduced Capability UE or NR-lite for short.

SUMMARY

In view of the above, embodiments of the disclosure provide methods and apparatuses for transmitting a paging control message and communication devices.

According to a first aspect of embodiments of the disclosure, there is provided a method for transmitting a paging control message performed by a base station. The method includes:

transmitting a Physical Downlink Control Channel (PDCCH) signaling corresponding to a user equipment (UE) type of a UE based on the UE type; in which the PDCCH signaling carries a paging control message for the UE; different UE types correspond to different PDCCH signaling, and the paging control message is configured to indicate scheduling information of a paging message.

According to a second aspect of embodiments of the disclosure, there is provided a method for transmitting a paging control message performed by user equipment (UE). The method includes:

receiving a Physical Downlink Control Channel (PDCCH) signaling by adopting a receiving parameter corresponding to a UE type of the UE, in which the PDCCH signaling carries a paging control message configured for paging the UE; different UE types correspond to different PDCCH signaling, and the paging control message is configured to indicate scheduling information of a paging message.

According to a third aspect of embodiments of the disclosure, there is provided a communication device. The communication device includes a processor, a transceiver, a memory, and a program stored on the memory and executable by the processor. The processor is configured to perform steps of the method for transmitting a paging control message described in the first aspect when running the program.

According to a fourth aspect of embodiments of the disclosure, there is provided a communication device. The communication device includes a processor, a transceiver, a memory, and a program stored on the memory and executable by the processor. The processor is configured to perform steps of the method for transmitting a paging control message described in the second aspect when running the program.

It is understandable that the above general description and the following detailed description are examples and explanations and cannot limit the embodiments of the disclosure.

BRIEF DESCRIPTION OF THE DRAWINGS

The drawings herein are incorporated into the specification and constitute a part of the specification, show embodiments in accordance with the disclosure, and together with the specification are used to explain the principles of the embodiments of the disclosure.

DETAILED DESCRIPTION

Here, embodiments will be described in detail, and examples thereof are shown in the accompanying drawings. When the following description refers to the drawings, unless otherwise indicated, the same numbers in different drawings indicate the same or similar elements. The implementation manners described in the following embodiments do not represent all implementation manners consistent with the embodiments of the disclosure. On the contrary, they are merely examples of devices and methods consistent with some aspects of the embodiments of the disclosure as detailed in the appended claims.

The terms used in the embodiments of the disclosure are only for the purpose of describing specific embodiments, and are not intended to limit the embodiments of the disclosure. The singular forms of "a", "said" and "the" used in the embodiments of the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms first, second, third, etc. may be used to describe various information in the embodiments of the disclosure, the information should not be limited to these terms. These terms are only used to distinguish the same type of information from each other. For example, without departing from the scope of the embodiments of the disclosure, the first information may also be referred to as second information, and similarly, the second information may also be referred to as first information. Depending on the context, the word "if" as used herein can be interpreted as "when" or "upon" or "in response to determining that".

Figure 1:
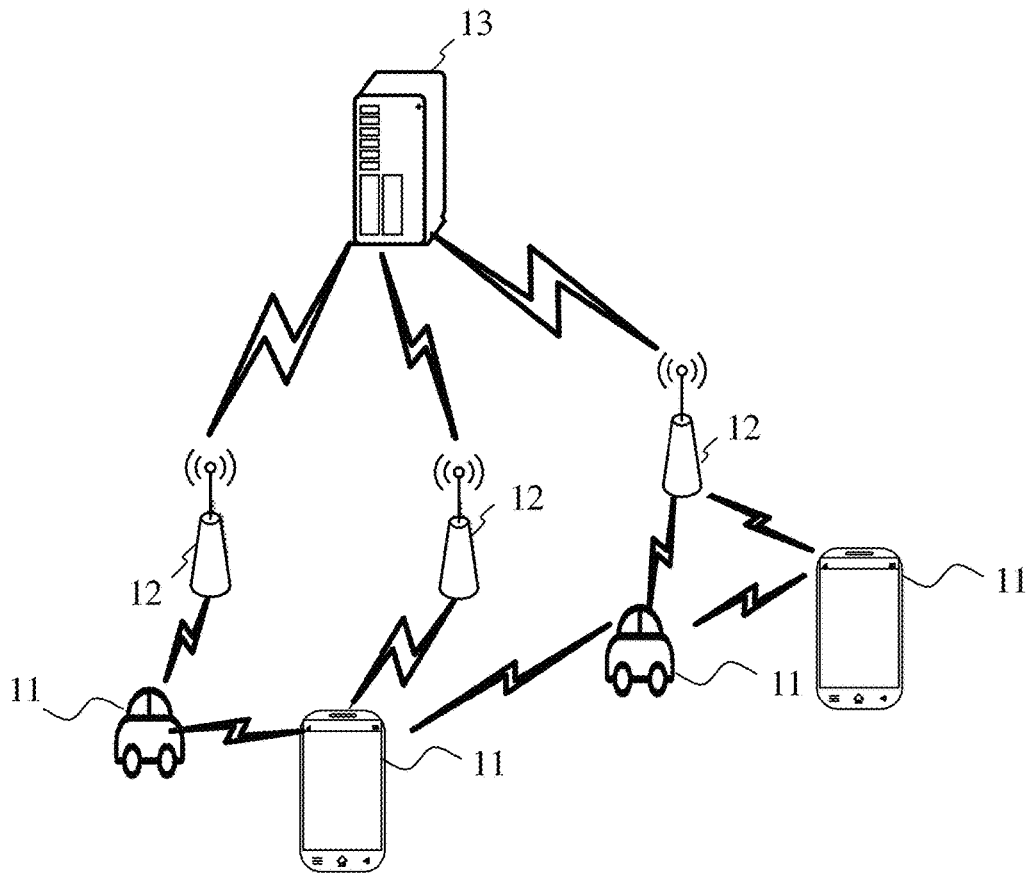
FIG. 1 is a schematic diagram illustrating a wireless communication system according to some embodiments.

FIG. 1 is a schematic diagram illustrating a wireless communication system according to embodiments of the disclosure. As illustrated in FIG. 1, the wireless communication system is a communication system based on cellular mobile communication technology. The wireless communication system may include several terminals 11 and several base stations 12.

The terminal 11 may be a device that provides voice and/or data connectivity to the user. The terminal 11 can communicate with one or more core networks via a Radio Access Network (RAN). The terminal 11 can be an Internet of Things (IoT) terminal, such as a sensor device, a mobile phone (or "cellular" phone), or a computer of the IoT terminal, for example, may be a fixed, portable, pocket-sized, handheld, computer built-in device, or a vehicle-mounted device. For example, Station (STA), subscriber unit, subscriber station, mobile station, mobile, remote station, access point, remote terminal, user agent, user device, or user equipment (UE). Alternatively, the terminal 11 may also be a device of an unmanned aerial vehicle. Alternatively, the terminal 11 may be a vehicle-mounted device, for example, it may be a trip computer with a wireless communication function, or a wireless communication device external to the trip computer. Alternatively, the terminal 11 may also be a roadside device, for example, it may be a street lamp, signal lights, or other roadside device with a wireless communication function.

The base station 12 may be a network side device in a wireless communication system. The wireless communication system may be the 4th generation mobile communication (4G) system, also known as the Long Term Evolution (LTE) system. Alternatively, the wireless communication system may be a 5G system, also known as new radio (NR) system or 5G NR system. Alternatively, the wireless communication system may also be the next-generation system of the 5G system. The access network in the 5G system can be called New Generation-Radio Access Network (NG-RAN). Or, the MTC system.

The base station 12 may be an Evolved Base Station (eNB) used in a 4G system. Alternatively, the base station 12 may be a base station (gNB) adopting a centralized and distributed architecture in the 5G system. When the base station 12 adopts a centralized and distributed architecture, the base station 12 usually includes a centralized unit (CU) and at least two distributed units (DU). The CU is provided with protocol stacks of a Packet Data Convergence Protocol (PDCP) layer, Radio Link Control (RLC) layer, and a Media Access Control (MAC) layer. The distributed unit is provided with a physical (PHY) layer protocol stack, and embodiments of the disclosure does not limit the specific implementation of the base station 12.

A wireless connection can be established between the base station 12 and the terminal 11 through a wireless air interface. In different implementations, the wireless air interface is a wireless air interface based on the fourth-generation mobile communication network technology (4G) standard. Alternatively, the wireless air interface is a wireless air interface based on the fifth-generation mobile communication network technology (5G) standard, for example, the wireless air interface is New Radio (NR). Alternatively, the wireless air interface may also be a wireless air interface based on a next-generation mobile communication network technology of the 5G.

In some embodiments, an End to End (E2E) connection can also be established between the terminals 11, such as vehicle to vehicle (V2V) communication, vehicle to infrastructure (V2I) communication and vehicle to pedestrian (V2P) communication in vehicle to everything (V2X) communication.

In some embodiments, the above-mentioned wireless communication system may further include a network management device 13.

Several base stations 12 are connected to the network management device 13 respectively. The network management device 13 may be a core network device in a wireless communication system. For example, the network management device 13 may be a Mobility Management Entity (MME) of an Evolved Packet Core (EPC). Alternatively, the network management device may be other core network devices, such as a Serving Gateway (SGW), a Public Data Network Gateway (PGW), and a Policy and Charging Rules Function (PCRF) or Home Subscriber Server (HSS), etc. The implementation form of the network management device 13 is not limited in embodiments of the disclosure.

The execution subject involved in embodiments of the disclosure includes, but are not limited to: UEs such as terminals supporting 5G cellular mobile communications, and base stations.

In the New Radio (NR) of the fifth generation (5G) cellular mobile communication system, a new type of user equipment (UE) has been used to cover the requirements of such mid-range IoT devices. This new type of UE is called Reduced Capability UE or NR-lite for short.

The requirements for NR-lite are: low cost, low complexity, a certain degree of coverage enhancement, and power saving. Since the current 5G NR is designed for high-end terminals of high-speed and low-latency, the current design cannot meet the above-mentioned requirements for the NR-lite. Therefore, the current NR system needs to be modified to meet the requirements of NR-lite.

An application scenario of embodiments of the disclosure is described as below. A search space carrying a paging control message in the NR is the type-2 Physical Downlink Control Channel (PDCCH) Common Search Space (type-2—PDCCH CSS), also called paging search space. The PDCCH carried in the paging search space is scrambled by Paging Radio Network Temporary Identity (P-RNTI) for Cyclic Redundancy Check (CRC). In the communication protocol, the P-RNTI generally uses a fixed field "FFFE". At the same time, the configuration of the paging search space includes the following parameters.

1. Identity (ID) of Control Resource Set (CORESET) accommodating the paging search space. When the CORESET is missing from the configuration of the paging search space in the configuration information, the UE defaults that the paging search space is transmitted in CORESET #0.

2. PDCCH monitoring starting slot time, including PDCCH monitoring period and time offset within the monitoring period.

3. Number of continuous PDCCH monitoring slots.

4. Monitoring mode of PDCCH in a single slot.

5. Aggregation level of Control Channel Elements (CCE) contained in the search space and the number of PDCCH transmission candidate positions corresponding to each aggregation level of CCE.

The paging search space determines a CCE resource in the corresponding CORESET according to a resource determination rule. The resource determination rule can be expressed by expression (1):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

where $Y_{p,n_{s,f}^{\mu}}$ represents the iteration value, for the paging search space, $Y_{p,n_{s,f}^{\mu}}=0$, $N_{CCE,p}$ represents the total number of CCEs contained in a CORESET, p represents the $p^{th}$ physical resource block set, L represents the aggregation level of CCE, i=0, ..., L−1, $M_{s,max}^{(L)}$ represents the number of candidate transmission positions corresponding to the aggregation level of CCE L, $m_{s,n_{CI}}=0, \ldots, M_{s,max}^{(L)}$, and $n_{CI}$ represents the value of the carrier indication field, for the paging search space.

In addition, in the configuration of the paging search space, in the same bandwidth part (BWP), all UEs monitor the same paging search space.

The Reduced capability UEs and non-Reduced capability UEs in other NRs share the same paging control message, which includes that they use the same paging PDCCH resource and the same paging PDSCH resource. The paging PDCCH signaling is transmitted in a paging search space. In practical applications, due to the different user capabilities of NR users and NR-lite users, sharing the paging search space will limit the flexibility of configuration.

Figure 2:
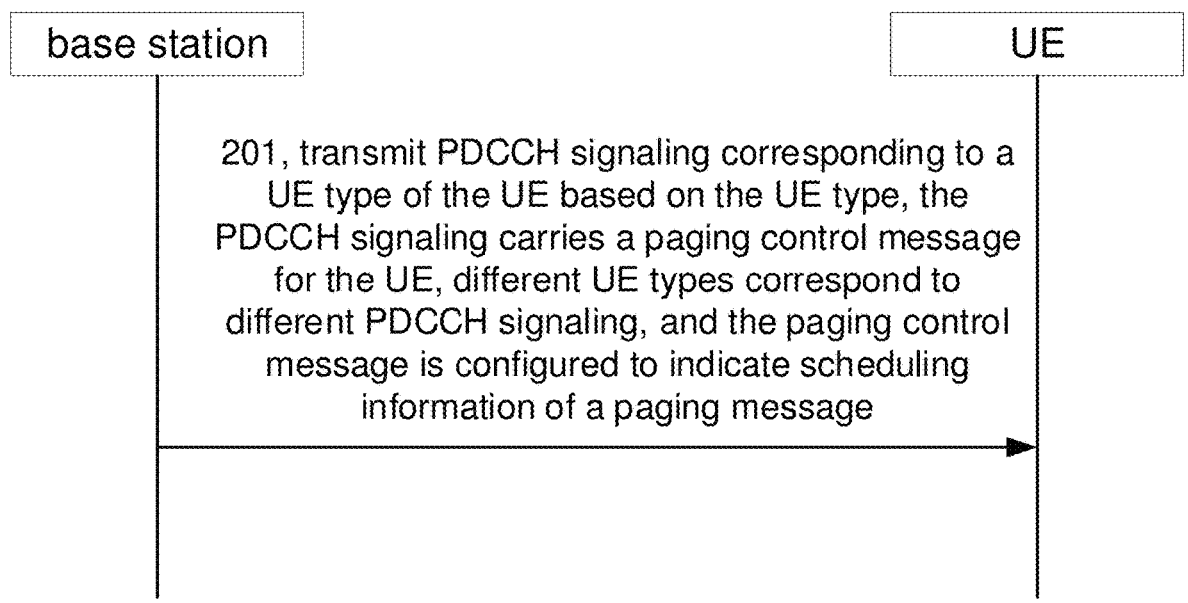
FIG. 2 is a flowchart illustrating a method for transmitting a paging control message according to some embodiments.

Embodiments provide a method for transmitting a paging control message performed by a base station in a mobile communication network. As illustrated in FIG. 2, the method for transmitting a paging control message may include the following.

In step 201, a PDCCH signaling corresponding to a UE type of a UE is transmitted based on the UE type. The PDCCH signaling carries a paging control message for the UE. Different UE types correspond to different PDCCH signaling. The paging control message is configured to indicate scheduling information of a paging message.

Different types of UEs may be UEs with different data transmission capabilities and/or different signal reception capabilities. Here, the data transmission capability may include transmission rate, and/or transmission delay, etc. There can be two or more types of UEs.

For example, the first type of UEs and the second type of UEs may be two types of multiple types of UEs. The first type of UEs may be Reduced capability UEs in a 5G cellular mobile communication system. The second type of UEs may be non-Reduced capability UEs in a 5G cellular mobile communication system, such as Enhanced Mobile Broadband (eMBB) terminals. Compared with the second type of UEs, the first type of UEs may have a lower number of transmissions and a higher transmission delay.

The scheduling information of the paging message may include PDSCH resource information and modulation and coding strategy information of the paging message. The base station may carry the paging control message in the PDCCH signaling and transmit a paging message based on a transmission resource indicated by the paging control message. The UE receives and analyzes the paging control information and receives the paging message on the PDSCH resource and using the modulation and coding strategy indicated by the control paging control message.

In the related art, the paging control message for the first type of UEs and the paging control message for the second type of UEs are carried in the same PDCCH signaling. The first type of UEs and the second type of UEs may have different data transmission capabilities and/or different signal reception capabilities. Therefore, the same PDCCH signaling needs to meet data transmission requirements and/or signal quality requirements of the first type of UEs and the second type of UEs at the same time, such that the transmission resource range of the PDCCH signaling is limited by both the first type of UEs and the second type of UEs, which reduces the flexibility of configuring the transmission resource of the PDCCH signaling.

Here, the first type of PDCCH signaling can be used to carry the paging control message for the first type of UEs and the second type of PDCCH signaling may be used to carry the paging control message for the second type of UEs respectively. The first type of PDCCH signaling is different from the second type of PDCCH signaling.

Here, the first type of PDCCH signaling and the second type of PDCCH signaling may be different PDCCH signaling with different transmission resources. As an example, the paging search space to which the first type of PDCCH signaling belongs may be different from the paging search space to which the second type of PDCCH signaling belongs. As another example, the transmission period of the first type of PDCCH signaling may be different from the transmission period of the second type of PDCCH signaling. As still another example, the transmission bandwidth of the first type of PDCCH signaling may be different from the transmission bandwidth of the second type of PDCCH signaling.

Different types of PDCCH signaling can meet the requirements of different types of UEs for data transmission and/or signal quality. For example, for a situation where the first type of UEs has higher signal quality requirements, the frequency domain resource with less interference can be used to transmit the first type of PDCCH signaling.

Receiving the PDCCH signaling by the UE includes receiving the PDCCH signaling corresponding to the UE type according to a receiving parameter corresponding to the UE type. The receiving parameter may be preset inside the UE. The receiving parameter may be a transmission resource parameter of the PDCCH signaling, and/or a PDCCH descrambling sequence, and/or time-frequency resource parameters of the paging search space to which the PDCCH signaling belongs.

For example, the first type of UEs may receive the first type of PDCCH signaling according to the receiving parameter corresponding to the first type of UEs.

The paging control messages carried by different PDCCH signaling can be different. Different paging control messages can indicate different scheduling information of paging messages. In this way, different types of UEs can receive their own paging information on different transmission resources, which improves the transmission flexibility of the paging messages and reduces the coupling between the paging messages of different types of UEs.

In this way, the PDCCH signaling corresponding to the UE type is used to carry the paging control message corresponding to that UE type. On the one hand, using the PDCCH signaling corresponding to the UE type to carry the corresponding paging control message meets the individual transmission requirement corresponding to each UE type and improves communication efficiency. On the other hand, different types of PDCCH signaling can meet the transmission requirements of paging control messages of different types of UEs, which reduces the coupling between paging control messages of different types of UEs and improves the transmission flexibility of paging control messages.

In some examples, the step 201 may include transmitting the PDCCH signaling on a paging search space shared between different types of UEs. Different types of UEs correspond to different scrambling sequences for the PDCCH signaling.

Here, the shared paging search space may be a paging search space that is common between different PDCCH signaling corresponding to different UE types. The paging search space may be a transmission resource of the PDCCH signaling carrying the paging control message. The paging search space can be type-2 PDCCH CSS.

The UE can monitor the PDCCH signaling in the shared paging search space. Here, the transmission resources for the base station to transmit different types of PDCCH signaling may be the same. Different types of UEs can monitor their PDCCH signaling in the same paging search space.

In order to distinguish different PDCCH signaling corresponding to different UE types, the base station may use different scrambling sequences to scramble different PDCCH signaling corresponding to different UE types.

For example, a scrambling sequence corresponding to the first type of UEs is used to scramble the first type of PDCCH signaling, and a scrambling sequence corresponding to the second type of UEs is used to scramble the second type of PDCCH signaling.

For example, a UE identification corresponding to the first type of UEs can be used to scramble the first type of PDCCH signaling and a UE identification corresponding to the second type of UE may be used to scramble the second type of PDCCH signaling. Here, the UE identification of the first type of UEs is different from the UE identification of the second type of UEs. The UE identification of the first type of UEs being different from the UE identification of the second type of UEs includes that the number of identification bits of the first type of UEs is different from the number of identification bits of the second type of UEs and/or the encoding method of the first type of UEs is different from the encoding method of the second type of UEs.

The receiving parameter may be a descrambling sequence of the UE. The scrambling sequences of the same type of UEs are the same as each other, and the descrambling sequences of the same type of UEs are the same as each other. After the UE receives the PDCCH signaling in the shared paging search space, the UE can use its own corresponding descrambling sequence to descramble the PDCCH signaling, and after the descrambling of the PDCCH signaling succeeds, the UE can determine that the PDCCH signaling is transmitted to itself.

In this way, different types of PDCCH signaling are carried through the same paging search space, which improves the carrying capacity of the paging search space and improves communication efficiency.

In some embodiments, the scrambling sequence is a Paging Radio Network Temporary Identity (P-RNTI). Different types of UEs have different P-RNTIs.

Here, different P-RNTIs can be allocated to different types of UEs, and the base station uses a scrambling sequence corresponding to the UE type to scramble the PDCCH signaling.

After receiving the PDCCH signaling, the UE side can use the P-RNTI corresponding to its own UE type to descramble the PDCCH signaling.

For example, the P-RNTI of the related art, such as FFFE, can be used for the non-Reduced capability UEs. For the Reduced capability UEs, a different P-RNTI can be newly fixed by the communication protocol, or a different P-RNTI can be configured by the base station.

In some embodiments, the step 201 may include transmitting the PDCCH in a paging search space of the PDCCH signaling corresponding to the UE type. Paging search spaces of different PDCCH signaling corresponding to different UE types are different.

Here, different PDCCH signaling corresponding to different UE types can be carried through different paging search spaces.

Here, the receiving parameter may be a resource parameter of the paging search space. Different types of UEs may receive respective PDCCHs in different paging search spaces corresponding to the respective UE types according to the resource parameters of the respective paging search spaces.

The resource parameter may include a frequency domain parameter and/or a time domain parameter of the paging search space. Different frequency domain parameters may indicate different frequency domain resources, and different time domain parameters may indicate different time domain resources.

Different paging search spaces corresponding to different UE types can be configured according to different UE types. For example, for the transmission capabilities of different UE types, paging search spaces corresponding to the transmission capabilities can be configured.

In this way, different PDCCH signaling corresponding to different UE types is carried by different paging search spaces, so that the paging search space to which the PDCCH signaling belongs matches the corresponding UE type, which improves the selection flexibility of the PDCCH signaling that carries the paging control message. This enables different types of PDCCH signaling to meet the transmission requirements of paging control messages of different types of UEs, reduces the coupling between the paging control messages of different types of UEs, reduces the error rate caused by data decoding during decoupling, and increase the success rate of receiving the PDCCH signaling by the UE.

In some embodiments, time domain resources of the paging search spaces of different PDCCH signaling corresponding to different UE types are different.

Here, the base station may respectively transmit different PDCCH signaling corresponding to different UE types in paging search spaces of different time domain resources.

The receiving parameter may be a resource parameter including a time domain resource of the paging search space. The UE may receive the PDCCH signaling in the paging search space of the time domain resource corresponding to its own UE type.

In this way, the paging control messages of different UE types can be carried by different PDCCH signaling that is transmitted using different time domain resources, so that different PDCCH signaling is used to carry the paging control messages of different types of UEs.

In some embodiments, periods of the paging search spaces of different PDCCH signaling corresponding to different UE types are different; or, periods of the paging search spaces of different PDCCH signaling corresponding to different UE types are the same, and time domain offsets in the periods of the paging search spaces of different PDCCH signaling corresponding to different UE types are different; or, transmission symbols in a single slot in the paging search spaces of different PDCCH signaling corresponding to different UE types are different.

Here, the base station may adopt different paging search spaces having different periods to respectively bear different PDCCH signaling corresponding to different UE types.

The receiving parameter may be a period of the paging search space, that is, a monitoring period in which the UE monitors the paging search space. The UE can monitor and receive the PDCCH signaling according to the monitoring period corresponding to its own UE type.

Here, for different PDCCH signaling corresponding to different UE types carried in the paging search spaces with the same period, the base station may respectively transmit different PDCCH signaling corresponding to different UE types based on different time domain offsets.

The receiving parameter can be a time domain offset in the period of the paging search space of the PDCCH signaling, that is, the time domain offset in the monitoring period in which the UE monitors the paging search space. The UE can monitor and receive the PDCCH signaling in the paging search space based on the time domain offset corresponding to its own UE type in the monitoring period.

The transmission symbol may be an Orthogonal Frequency Division Multiplexing (OFDM) symbol, and the single slot may be composed of multiple OFDM symbols. Different PDCCH signaling corresponding to different UE types can be carried by adopting multiple different OFDM symbols.

For instance, a single slot has 8 symbols, the first type of PDCCH signaling may be carried by the first symbol, the third symbol and the fifth symbol, and the second type of PDCCH signaling may be carried by the second symbol, the fourth symbol and the fifth symbol.

The receiving parameter may be positions of multiple transmission symbols carrying the PDCCH in a single slot. The UE may receive the PDCCH signaling in one single slot according to multiple transmission symbols for bearing the PDCCH according to its own UE type.

For the transmission symbols carrying the PDCCH in one single slot of different UE types, corresponding monitoring modes can be established. The monitoring mode can be a way of monitoring transmission symbols in a single slot. The transmission symbols carrying the PDCCH in a single lot monitored in different monitoring modes are different. The UE can monitor the transmission symbols carrying the PDCCH in a single slot based on the monitoring mode corresponding to its own UE type.

In some embodiments, the Control Resource Sets (CORESET) to which the paging search spaces of different PDCCH signaling corresponding to different UE types belong are different.

The CORESET includes resources such as a frequency band in the frequency domain occupied by a PDCCH signaling in the paging search space, and the number of OFDM symbols in the time domain occupied by the PDCCH signaling in the paging search space.

The base station can transmit different PDCCH signaling corresponding to different UE types by adopting different CORESETs respectively.

The UE may receive a PDCCH signaling based on the CORESET corresponding to its own UE type.

For instance, it can be configured that the non-Reduced capability UE can adopt the CORESET #1 and the Reduced capability UE can adopt the CORESET #0.

In this way, paging control messages of different UE types can be carried on different PDCCH signaling that is carried by different CORESETs, so that different PDCCH signaling can be used to carry the paging control messages of different types of UEs.

In some embodiments, the step 201 may include transmitting the PDCCH signaling on a candidate CCE resource determined based on a resource determination rule on the CORESET shared between different types of UEs.

Different UE types correspond to different resource determination rules.

Here, the CCE resources determined by adopting different rule parameters on the CORESET shared between different types of UEs are different.

The CCE resource is a basic unit of the transmission resource of the shared paging search space carrying the PDCCH signaling. The paging search space carrying the PDCCH signaling may have one or more CCE resources.

The CCE resource carrying the PDCCH signaling can be determined using the resource determination rule represented as expression (1). Different resource determination rules can obtain different CCE resources.

Here, on the CORESET shared between different types of UEs, different resource determination rules are set for different UE types, so as to obtain different candidate CCE resources. Different candidate CCE resources can be used to carry different PDCCH signaling of different UE types.

In this way, by setting different resource determination rules for different UE types, paging control messages of different UE types can be carried on different PDCCH signaling carried by different CCE resources, so that different PDCCH signaling is used to carry the paging control messages of different types of UEs.

In some embodiments, rule parameters of the resource determination rules corresponding to different UE types are different.

The rule parameter includes an offset parameter and/or a randomization parameter.

For different UE types, different offset parameters and/or different randomization parameters can be used.

Here, the offset parameter can be 0. Based on different offset parameters, different CCE resources can be obtained through the resource determination rules, to realize different transmission resources of the PDCCH signaling.

Alternatively, it is also possible to randomize the predetermined rule parameter of the resource determination rule, and obtain different CCE resources using different randomized parameters.

For example, by setting the offset parameter X on the basis of the resource determination rule denoted by expression (1), the resource determination rule denoted by expression (2) can be obtained. The CCS resource obtained through the resource determination rule denoted by the expression (1) is different from the CCE resource obtained through the resource determination rule denoted by the expression (2).

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} + X \right) \mod \lfloor N_{CCE,p}/L \rfloor \right\} + i \quad (2)$$

where $Y_{p,n_{s,f}^\mu}$ represents the iteration value, for the paging search space, $Y_{p,n_{s,f}^\mu}=0$, $N_{CCE,p}$ represents the total number of CCEs contained in a CORESET, p represents the $p^{th}$ physical resource block set, L represents the aggregation level of CCE represents the number of candidate transmission positions corresponding to the aggregation level of CCE L, $m_{s,n_{CI}}=0, \ldots, M_{s,\,max}^{(L)}$ and $n_{CI}$ represents the value of the carrier indication field, for the paging search space, $n_{CI}=0$.

For the first type of UEs, X may not be equal to 0, and for the second type of UEs, X may be 0. In this way, the second type of UEs may use the CCE resource of the related art to transmit the second PDCCH signaling and the first type of UEs may use the CCE resource different from the CSS resource of the second type of UEs to transmit the first PDCCH signaling.

For example, for the non-Reduced capability UEs, it can be configured that X is 0; and for the Reduced capability UEs, it can be configured that X is not 0.

The offset parameter may be an offset value of a specific parameter of the existing resource determination rule. For example, the offset parameter can be an offset value of $Y_{p,n_{s,f}^\mu}$.

For instance, for the non-Reduced capability UE, it can be configured that the offset value of $Y_{p,n_{s,f}^\mu}$ is 0; and for the Reduced capability UE, it can be configured that the offset value of $Y_{p,n_{s,f}^\mu}$ is not 0. In this way, it is possible to configure different CCE resources for non-Reduced capability UEs and the Reduced capability UEs.

In some embodiments, aggregation levels of PDCCH resources of different PDCCH signaling corresponding to different UE types are different; and/or, numbers of candidate transmission positions of PDCCH resources of different PDCCH signaling corresponding to different UE types are different.

The aggregation level may be the number of CCE resources constituting one PDCCH resource. The aggregation level can be 1, 2, 4, or 8. The aggregation level can represent the number of CCE resources in the PDCCH resource. For example, the number of CCE resources in the PDCCH resource with an aggregation level of 8 is 8.

The PDCCH resources having different aggregation levels are different.

Therefore, the PDCCH resources having different aggregation levels are used to respectively transmit different PDCCH signaling corresponding to different UE types. In this way, it is possible to use different PDCCH signaling to carry paging control messages of different types of UEs.

There are multiple CCE resources in the paging search space, for example, there are 88 CCE resources in the paging search space. There can be multiple positions in the paging search space for the PDCCH resource having the same aggregation level. That is, there are multiple candidate transmission positions for the PDCCH resource. Here, the PDCCH resources at different candidate transmission positions may be used to respectively transmit the first PDCCH signaling and the second PDCCH signaling. In this way, different PDCCH signaling can be used to carry paging control messages of different types of UEs.

Figure 3:
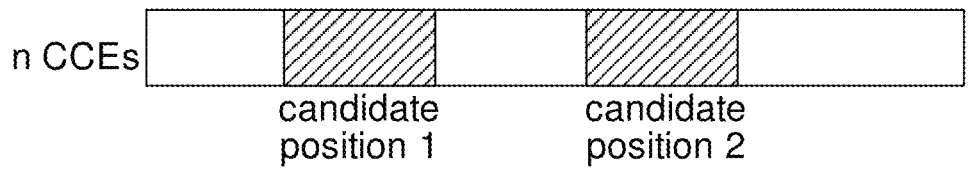
FIG. 3 is a schematic diagram illustrating candidate PDCCH resource positions according to some embodiments.

For instance, as illustrated in FIG. 3, there are n CCE resources in the paging search space. Taking n=88 as an example, there may be two candidate positions in the paging search space for the PDCCH resource with an aggregation level of 8, candidate position 1 and candidate position 2. The PDCCH resource at the candidate position 1 may be used to transmit the first PDCCH signaling, and the PDCCH resource at the candidate position 2 may be used to transmit the second PDCCH signaling.

Figure 4:
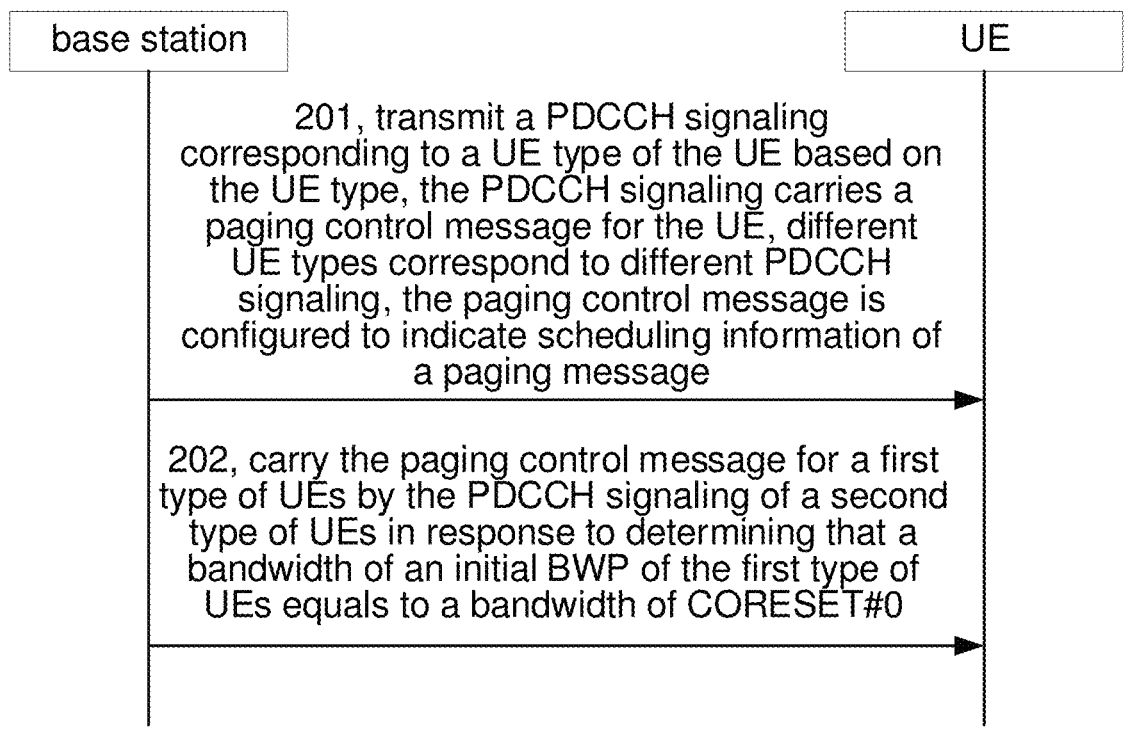
FIG. 4 is a flowchart illustrating another method for transmitting a paging control message according to some embodiments.

In some embodiments, as illustrated in FIG. 4, the method for transmitting a paging control message may further include the following.

In step 202, in response to determining that a bandwidth of an initial broadband part (BWP) of the first type of UEs is equal to a bandwidth of CORESET #0, the PDCCH signaling of the second type of UEs is used to carry the paging control message for the first type of UEs.

The base station can configure different PDCCH signaling to carry the paging control messages of different UEs. For example, the base station may configure that the second type of PDCCH signaling is used to bear the paging control message.

In the configuration of the paging search space, if the BWPs of different types of UEs are the same, different types of UEs can monitor the same paging search space, that is, the PDCCH signaling of different types of UEs is the same.

For instance, whether the non-Reduced capability UE and the Reduced capability UE use different paging PDCCH signaling or not may be configured by the base station or determined according to other conditions. For example, if the bandwidth of the initial BWP of the Reduced capability UE is equal to the bandwidth of CORESET #0, it is configured that the Reduced capability UE uses the same PDCCH signaling as that used by the non-Reduced capability UE to carry the paging control message.

In this way, the base station can flexibly configure the PDCCH used by the UE.

In some embodiments, the method for transmitting a paging control message may further include: transmitting a configuration signaling. The configuration signaling is configured to indicate that the paging control message for the first type of UEs is carried by the PDCCH signaling corresponding to the first type of UEs or by the PDCCH signaling corresponding to the second type of UEs.

The base station can configure different PDCCH signaling to carry paging control messages for different types of UEs. For example, the base station may configure for the first type of UEs that the paging control message is carried by a second type of PDCCH signaling corresponding to the second type of UEs.

In this way, the base station can flexibly configure the PDCCH used by the UE.

In some embodiments, data transmission capabilities, and/or signal reception capabilities, and/or power consumptions of signal reception capabilities of different types of UEs are different.

Different types of UEs may be UEs with different data transmission capabilities and/or different signal reception capabilities. Here, the data transmission capability may include transmission rate, and/or transmission delay, etc. There can be two or more types of UEs.

Figure 5:
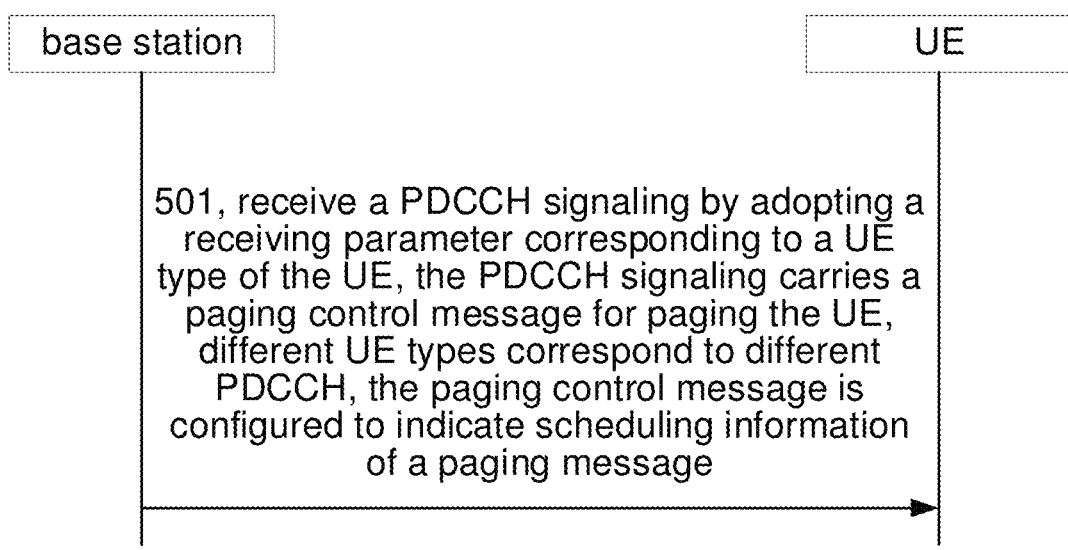
FIG. 5 is a flowchart illustrating yet another method for transmitting a paging control message according to some embodiments.

The first type of UEs may be Reduced capability UEs in a 5G cellular mobile communication system. The second type of UEs may be non-Reduced capability UE in a 5G cellular mobile communication system, such as Enhanced Mobile Broadband (eMBB) terminals. Embodiments provide a method for transmitting a paging control message transmission performed by UE in a mobile communication network. As illustrated in FIG. 5, the method for transmitting a paging control message may include the following.

In step 501, PDCCH signaling is received by adopting a receiving parameter corresponding to a UE type of a UE. The PDCCH signaling carries a paging control message for paging the UE, different UE types correspond to different PDCCH signaling, and the paging control message is configured to indicate scheduling information of a paging message.

Different types of UEs may be UEs with different data transmission capabilities and/or different signal reception capabilities. Here, the data transmission capability may include: transmission rate, and/or transmission delay, etc. There can be two or more types of UEs.

For example, the first type of UEs and the second type of UEs may be two types of multiple types. The first type of UEs may be Reduced capability UEs in a 5G cellular mobile communication system. The second type of UEs may be non-Reduced capability UEs in a 5G cellular mobile communication system, such as Enhanced Mobile Broadband (eMBB) terminals. Compared with the second type of UEs, the first type of UEs may have a lower number of transmissions and a higher transmission delay.

The scheduling information of the paging message may include PDSCH resource information and modulation and coding strategy information of the paging message. The base station may carry the paging control message in the PDCCH signaling and transmit a paging message based on a transmission resource indicated by the paging control message. The UE receives and analyzes the paging control information and receives the paging message on the PDSCH resource and using the modulation and coding strategy indicated by the paging control message.

In the related arts, the paging control message for the first type of UEs and the paging control message for the second type of UEs are carried in the same PDCCH signaling. The first type of UEs and the second type of UEs may be UEs with different data transmission capabilities and/or different signal reception capabilities. Therefore, the same PDCCH signaling needs to meet data transmission requirements and signal quality requirements of the first type of UEs and the second type of UEs at the same time such that the transmission resource range of the PDCCH signaling is limited by both the first type of UEs and the second type of UEs, which reduces the flexibility of configuring the transmission resource of the PDCCH signaling.

Here, the first type of PDCCH signaling is used to carry the paging control message for the first type of UEs and the second type of PDCCH signaling may be used to carry the paging control message for the second type of UEs. The first type of PDCCH signaling is different from the second type of PDCCH signaling.

Here, the first type of PDCCH signaling and the second type of PDCCH signaling may be different PDCCH signaling with different transmission resources. For example, the paging search space of the first type of PDCCH signaling may be different from the paging search space of the second type of PDCCH signaling, or the transmission period of the first type of PDCCH signaling may be different from the transmission period of the second type of PDCCH signaling, or the transmission bandwidth of the first type of PDCCH signaling may be different from the transmission bandwidth of the second type of PDCCH signaling.

Different types of PDCCH signaling can meet the requirements of different types of UEs for data transmission and/or signal quality. For example, for a situation where the first type of UEs have higher signal quality requirements, frequency domain resources with less interference can be used to transmit a first type of PDCCH signaling.

In receiving the PDCCH signaling, the UE can receive the PDCCH signaling corresponding to the UE type according to the receiving parameter corresponding to its own UE type. The receiving parameter may be preset inside the UE. The receiving parameter may be a transmission resource parameter of the PDCCH signaling, and/or a PDCCH descrambling sequence, and/or time-frequency resource parameters of the paging search space to which the PDCCH signaling belongs.

For example, the first type of UEs may receive the first type of PDCCH signaling according to the receiving parameter corresponding to the first type of UE.

The paging control information carried by different PDCCH signaling can be different. Different paging control information can indicate the scheduling information of different paging messages. In this way, different types of UEs can receive their own paging information on different transmission resources, which improves the transmission flexibility of the paging message and reduces the coupling between paging messages of different types of UEs.

In this way, the paging control message corresponding to the UE type is carried by the PDCCH signaling corresponding to the UE type. On the one hand, different PDCCH signaling corresponding to different UE type is used to carry the paging control messages to meet different transmission requirements of different UE types, which improves communication efficiency. On the other hand, different types of PDCCH signaling can meet the transmission requirements of paging control messages of different types of UEs, which reduce the coupling between paging control messages of different types of UEs and improves the transmission flexibility of the paging control messages.

In some embodiments, the step 501 may include receiving the PDCCH signaling in a paging search space shared between different types of UEs; and descrambling the PDCCH signaling by adopting a descrambling sequence corresponding to the UE type.

Scrambling sequences of the PDCCH signaling corresponding to different UE types are different.

Here, the shared paging search space may be a paging search space that is common between different PDCCH signaling corresponding to different UE types. The paging search space may be a transmission resource of PDCCH signaling carrying a paging control message. The paging search space can be type-2 PDCCH CSS.

The UE can monitor the PDCCH signaling in the shared paging search space.

Here, the transmission resources for the base station to transmit different types of PDCCH signaling can be the same. Different types of UEs can monitor their respective PDCCH signaling in the same paging search space.

In order to distinguish different PDCCH signaling corresponding to different UE types, the base station may use different scrambling sequences to scramble the PDCCH signaling corresponding to different UE types.

For example, a scrambling sequence corresponding to the first type of UEs is used to scramble the first type of PDCCH signaling, and a scrambling sequence corresponding to the second type of UEs is used to scramble the second type of PDCCH signaling.

For example, the first type of PDCCH signaling may be scrambled by adopting a UE identification corresponding to the first type of UEs and the second type of PDCCH signal can be scrambled by adopting a UE identification corresponding to the second type of UEs. Here, the UE identification of the first type of UEs is different from the UE identification of the second type of UEs. The UE identification of the first type of UEs being different from the UE identification of the second type of UEs includes that the number of identification bits of the first type of UEs is different from the number of identification bits of the second type of UEs and/or the encoding method of the first type of UEs is different from the encoding method of the second type of UEs.

The receiving parameter may be a descrambling sequence of the UE. The scrambling sequences of the same type of UEs are the same as each other and descrambling sequences of the same type of UEs are the same as each other. After receiving the PDCCH signaling in the shared paging search space, the UE can use the descrambling sequence corresponding to itself to descramble the PDCCH signaling, and after the descrambling of the PDCCH signaling succeeds, the UE determines that the PDCCH signaling is the PDCCH signaling transmitted to itself.

In this way, different types of PDCCH signaling are carried through the same paging search space, which improves the carrying capacity of the paging search space and improves communication efficiency.

In some embodiments, the descrambling sequence is P-RNTI, and P-RNTIs of different types of UEs are different.

Here, different P-RNTIs can be allocated to different types of UEs, and the base station uses a scrambling sequence corresponding to the UE type to scramble the PDCCH signaling.

After receiving the PDCCH signaling, the UE side can use the P-RNTI corresponding to its own UE type to descramble the PDCCH signaling.

For example, the P-RNTI of the related art, such as FFFE, can be used for the non-Reduced capability UEs. For the Reduced capability UEs, a different P-RNTI can be newly fixed by the communication protocol, or a different P-RNTI can be configured by the base station.

In some embodiments, the receiving parameter includes a resource parameter.

The step 501 may include: receiving the PDCCH signaling in the paging search space of the PDCCH signaling corresponding to the UE type by adopting the resource parameter corresponding to the UE type. The paging search spaces of different PDCCH signaling corresponding to different UE types are different.

Here, different PDCCH signaling corresponding to different UE types can be carried through different paging search spaces.

Here, the receiving parameter may be a resource parameter of the paging search space, and different types of UEs may receive respective PDCCHs in the paging search spaces corresponding to the respective UE types according to the resource parameters of the respective paging search spaces.

The resource parameter may include a frequency domain parameter and/or a time domain parameter of the paging search space. Different frequency domain parameters may indicate different frequency domain resources, and different time domain parameters may indicate different time domain resources.

Different paging search spaces corresponding to different UE types can be configured according to the UE types. For example, for different transmission capabilities of different UE types, paging search spaces corresponding to the transmission capabilities can be configured.

In this way, different PDCCH signaling corresponding to different UE types is carried by different paging search spaces, so that the paging search space to which the PDCCH signaling belongs matches the corresponding UE type, which improves the selection flexibility of the PDCCH signaling that carries the paging control message. This enables different types of PDCCH signaling to meet the transmission requirements of paging control messages of different types of UEs, reduces the coupling between paging control messages of different types of UEs, reduces the error rate caused by data decoding during decoupling, and increase the success rate of receiving the PDCCH signaling by the UE.

In some embodiments, the receiving parameter includes a time domain resource parameter.

The step 501 may include receiving the PDCCH signaling on a time domain to which the paging search space of the PDCCH signaling corresponding to the UE type belongs by adopting the time domain resource parameter corresponding to the UE type. Time domains to which the paging search spaces corresponding to different UE types are different.

Here, the base station may respectively transmit different PDCCH signaling corresponding to different UE types in paging search spaces of different time domain resources.

The receiving parameter may be a resource parameter including the time domain resource of the paging search space. The UE may receive the PDCCH signaling in the paging search space of the time domain resource corresponding to its own UE type.

In this way, the paging control messages of different UE types can be carried on different PDCCH signaling that is transmitted using different time domain resources, so that different PDCCH signaling is used to carry the paging control messages of different types of UEs.

In some embodiments, the time domain resource parameter includes one of the following: a period of the paging search space of PDCCH signaling corresponding to the UE type; a time domain offset in the period of the paging search space of the PDCCH signaling corresponding to the UE type; or transmission symbols in a single slot in the paging search space of the PDCCH signaling corresponding to the UE type.

Here, the base station may use paging search spaces having different periods to respectively bear different PDCCH signaling corresponding to different UE types.

The receiving parameter may be the period of the paging search space, that is, the monitoring period in which the UE monitors the paging search space. The UE can monitor and receive the PDCCH signaling according to the monitoring period corresponding to its own UE type.

Here, for different PDCCH signaling corresponding to different UE types carried in the paging search spaces with the same period, the base station may respectively transmit different PDCCH signaling corresponding to different UE types based on different time domain offsets.

The receiving parameter can be the time domain offset in the period of the paging search space of the PDCCH signaling, that is, the time domain offset in the monitoring period in which the UE monitors the paging search space.

The UE monitors and receives the PDCCH signaling based on the time domain offset corresponding to its own UE type in the monitoring period.

The transmission symbol may be an Orthogonal Frequency Division Multiplexing (OFDM) symbol, and a single slot may be composed of multiple OFDM symbols. Different PDCCH signaling corresponding to different UE types can be carried by multiple different OFDM symbols.

For instance, a single slot has 8 symbol. The first type of PDCCH signaling may be carried by the first symbol, the third symbol, and the fifth symbol, and the second type of PDCCH signaling may be carried by the second symbol, the fourth symbol and the fifth symbol.

The receiving parameter may be positions of multiple transmission symbols bearing the PDCCH in a single slot. The UE may receive the PDCCH signaling in one single slot based on the multiple transmission symbols carrying the PDCCH corresponding to its own UE type.

For the transmission symbols carrying the PDCCH in a single slot of different UE types, corresponding monitoring modes can be established. The monitoring mode can be a way of monitoring transmission symbols in a single slot. The transmission symbols carrying the PDCCH in a single slot monitored in different monitoring modes are different. The UE can monitor the transmission symbols carrying the PDCCH in a single slot based on the monitoring mode corresponding to its own UE type.

In some embodiments, the receiving parameter includes a Control Resource Set (CORESET) parameter.

The Step 501 may include: receiving the PDCCH signaling on the CORESET to which the paging search space of the PDCCH signaling corresponding to the UE type belongs. The CORESETs to which the paging search spaces of different PDCCH signaling corresponding to different UE types are different.

The CORESET includes resources such as a frequency band occupied by the PDCCH signaling in the paging search space in the frequency domain, and the number of OFDM symbols occupied by the PDCCH signaling in the paging search space in the time domain.

The base station can use different CORESETs to respectively transmit different PDCCH signaling corresponding to different UE types.

The UE may receive the PDCCH signaling based on the CORESET corresponding to its own UE type.

For example, it can be configured that the CORESET #1 is adopted for non-Reduced capability UEs and CORESET #0 is adopted for the Reduced capability UEs.

In this way, the paging control messages for different UE types can be carried on different PDCCH signaling that is carried by different CORESETs, so that different PDCCH signaling is used to carry the paging control messages for different types of UEs.

In some embodiments, the receiving parameter includes a rule parameter of a resource determination rule.

The step 501 may include receiving the PDCCH signaling on a candidate CCE resource determined according to the resource determination rule of the PDCCH signaling corresponding to the UE type.

Different UE types correspond to different resource determination rules.

Here, the CCE resources determined by adopting different rule parameters on the CORESET shared between different types of UEs are different.

The CCE resource is the basic unit of the transmission resource of the shared paging search space that carries the PDCCH signaling. The paging search space carrying the PDCCH signaling may have one or more CCE resources.

The CCE resources that carry the PDCCH signaling can be determined using the resource determination rule represented by the expression (1). Different resource determination rules can obtain different CCE resources.

Here, on the CORESET shared between different types of UEs, different resource determination rules are set for different types of UEs, to obtain different candidate CCE resources. Different candidate CCE resources can be used to carry different PDCCH signaling of different UE types.

In this way, by setting different resource determination rules for different UE types, paging control messages of different UE types can be carried on different PDCCH signaling carried by different CCE resources, so that different PDCCH signaling is used to carry the paging control messages of different types of UEs.

In some embodiments, the rule parameters of the resource determination rules corresponding to different UE types are different;

The rule parameter includes: an offset parameter and/or a randomization parameter.

For different UE types, different offset parameters and/or different randomization parameters can be used.

Here, the offset parameter can be 0. Based on different offset parameters, different CCE resources can be obtained through the resource determination rules to achieve different transmission resources of the PDCCH signaling.

Alternatively, it is also possible to randomize the predetermined rule parameter of the resource determination rule, and different CCE resources can be obtained by adopting different randomization parameters.

For example, by setting the offset parameter X on the basis of the resource determination rule denoted by expression (1), the resource determination rule denoted by expression (2) can be obtained. The CCS resource obtained through the resource determination rule denoted by expression (1) is different from the CCE resource obtained through the resource determination rule denoted by expression (2).

In the expression (2), where $Y_{p,n_s,f}^{\mu}$ represents the iteration value, for the paging search space, $Y_{p,n_s,f}^{\mu}=0$, $N_{CCE,p}$ represents the total number of CCEs contained in a CORESET, P represents the $p^{th}$ physical resource block set, L represents the aggregation level of CCE, i=0, ..., L−1, $M_{s,\,max}^{(L)}$ represents the number of candidate transmission positions corresponding to the aggregation level of CCE L, $m_{s,n_{\rho}}=0, \ldots, M_{s,\,max}^{(L)}-1$, and $n_{\alpha}$ represents the value of the carrier indication field, for the paging search space, $n_{CI}=0$.

For the first type of UEs, X may not be equal to 0, and for the second type of UEs, X may be 0. In this way, the second type of UEs may use the CCE resource of the related art to transmit the second PDCCH signaling and the first type of UEs may use the CCE resource different from the CSS resource of the second type of UEs to transmit the first PDCCH signaling.

For example, for the non-Reduced capability UEs, it can be configured that X is 0; and for the Reduced capability UEs, it can be configured that X is not 0.

The offset parameter may be an offset value of a specific parameter of the existing resource determination rule. For example, the offset parameter can be an offset value of $Y_{p,n_s,f}^{\mu}$.

For instance, for the non-Reduced capability UE, it can be configured that the offset value of $Y_{p,n_s,f}^{\mu}$ is 0; and for the Reduced capability UE, it can be configured that the offset value of $Y_{p,n_s,f}^{\mu}$ is not 0. In this way, it is possible to configure different CCE resources for non-Reduced capability UEs and the Reduced capability UEs.

In some embodiments, the receiving parameter includes a PDCCH resource parameter.

Receiving the PDCCH signaling by adopting the receiving parameter corresponding to the UE type includes receiving the PDCCH signaling on the PDCCH resource of the PDCCH signaling by adopting the PDCCH resource parameter of the PDCCH signaling corresponding to the UE type. PDCCH resources of different PDCCH signaling corresponding to different UE types are different.

The PDCCH signaling is carried by the PDCCH resource. Here, a different PDCCH resource may be used to transmit the second PDCCH signaling corresponding to a different UE type. In this way, different PDCCH signaling can be used to carry paging control messages of different types of UEs.

In some embodiments, the PDCCH resource parameter includes one of the following: an aggregation level of the PDCCH resource of the PDCCH signaling; and/or, the number of candidate transmission positions of the PDCCH resource of the PDCCH signaling.

The aggregation level may be the number of CCE resources constituting one PDCCH resource. The aggregation level can be 1, 2, 4, or 8. The aggregation level can represent the number of CCE resources in the PDCCH resource. For example, the number of CCE resources in the PDCCH resource with an aggregation level of 8 is 8.

The PDCCH resources having different aggregation levels are different.

Therefore, the PDCCH resources having different aggregation levels are used to respectively transmit different PDCCH signaling corresponding to different UE types. In this way, it is possible to use different PDCCH signaling to carry the paging control messages of different types of UEs.

There are multiple CCE resources in the paging search space, for example, there are 88 CCE resources in the paging search space. There can be multiple positions in the paging search space for the PDCCH resource having the same aggregation level. That is, there are multiple candidate transmission positions for PDCCH resource. Here, the PDCCH resources at different candidate transmission positions may be used to respectively transmit the first PDCCH signaling and the second PDCCH signaling. In this way, different PDCCH signaling can be used to carry paging control messages of different types of UEs.

For instance, as illustrated in FIG. 3, there are n CCE resources in the paging search space. Taking n=88 as an example, there may be two candidate positions in the paging search space for the PDCCH resource with an aggregation level of 8, candidate position 1 and candidate position 2. The PDCCH resource at the candidate position 1 may be used to transmit the first PDCCH signaling, and the PDCCH resource at the candidate position 2 may be used to transmit the second PDCCH signaling.

Figure 6:
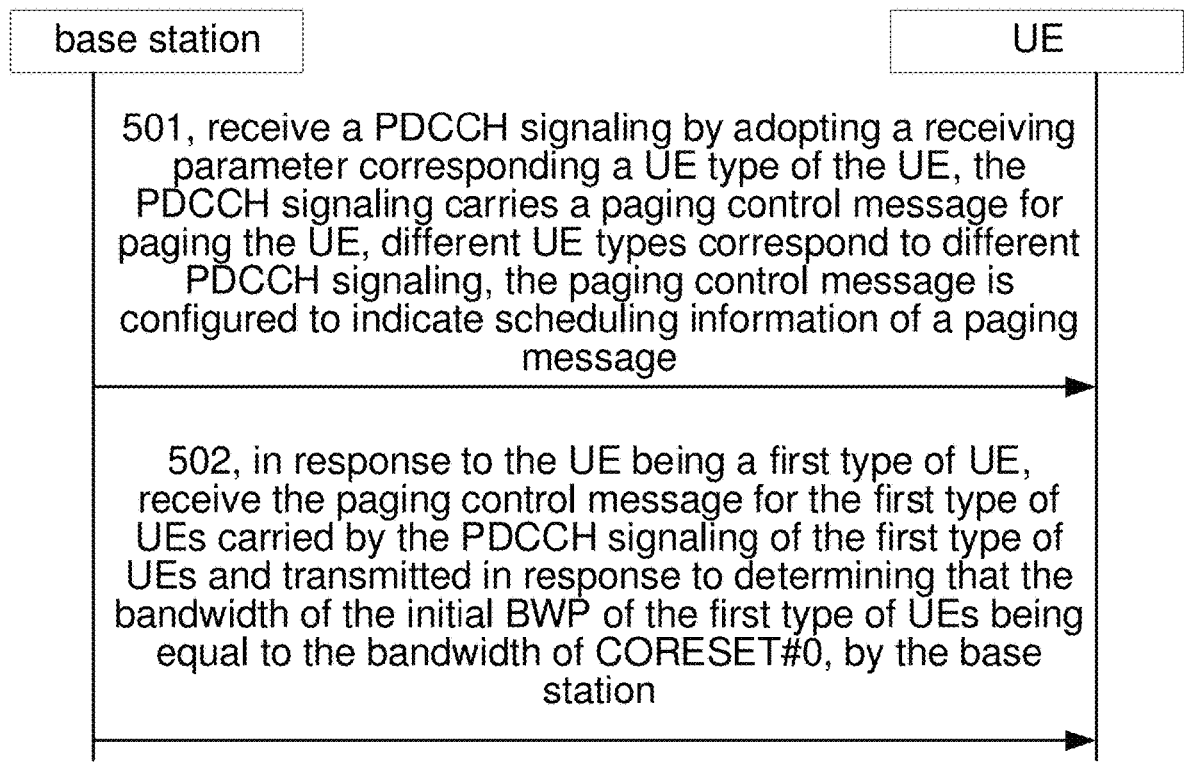
FIG. 6 is a flowchart illustrating still another method for transmitting a paging control message according to some embodiments.

In some embodiments, as illustrated in FIG. 6, the method for transmitting a paging control message may further include the following.

In step 502, in response to determining that the UE is the first type of UE, the paging control message for the first type of UEs carried by the PDCCH signaling of the second type of UEs and transmitted, in response to determining that a bandwidth of an initial BWP of the first type of UEs equals to the bandwidth of CORESET #0, by the base station is received.

The base station can configure different PDCCH signaling that carries the paging control messages of different UEs.

For example, the base station can configure that the paging control message is carried by a second type of PDCCH signaling.

In the configuration of the paging search space, if the BWPs of different types of UEs are the same, different types of UEs can monitor the same paging search space, that is, the PDCCH signaling of different types of UEs is the same.

For instance, whether the non-Reduced capability UE and the Reduced capability UE use different paging PDCCH signaling or not may be configured by the base station or determined according to other conditions. For example, if the bandwidth of the initial BWP of the Reduced capability UE is equal to the bandwidth of CORESET #0, it is configured that the Reduced capability UE uses the same PDCCH signaling as that used by the non-Reduced capability UE to carry the paging control message.

In this way, the base station can flexibly configure the PDCCH used by the UE.

In some embodiments, the method for transmitting a paging control message may further include: receiving configuration signaling, and adopting the PDCCH signaling indicated by the configuration signaling to carry the paging control message.

The base station can configure different PDCCH signaling to carry paging control messages for different types of UEs. For example, the base station may configure for the first type of UEs that the paging control message is carried by a second type of PDCCH signaling corresponding to the second type of UEs.

In this way, the base station can flexibly configure the PDCCH used by the UE.

In some embodiments, data transmission capabilities, and/or signal reception capabilities, and/or power consumptions of signal reception capabilities of different types of UEs are different.

Different types of UEs may be UEs with different data transmission capabilities and/or different signal reception capabilities. Here, the data transmission capability may include transmission rate, and/or transmission delay, etc. There can be two or more types of UEs.

The first type of UEs may be Reduced capability UEs in a 5G cellular mobile communication system. The second type of UEs may be non-Reduced capability UEs in a 5G cellular mobile communication system, such as Enhanced Mobile Broadband (eMBB) terminals.

A specific example is provided below in conjunction with any of the foregoing embodiments.

The core of the solution in embodiments is to configure different paging PDCCHs for the Reduced capability UEs (also called NR-lite users) and non-Reduced capability UEs (also called other NR users.

1. The paging PDCCHs of NR-lite users and other NR users are respectively transmitted. That is, the transmission is not multiplexed for the paging control messages of other NR users and the paging control messages of NR-lite users, but the paging control messages of other NR users and the paging control messages of NR-lite users are transmitted separately.

A. NR-lite users and other NR users still share the paging search space, but their respective PDCCHs are scrambled by adopting different P-RNTIs. For example, other NR users still use the original P-RNTI, while for the NR-lite users, another P-RNTI can be fixed by the protocol or another P-RNTI can be configured by the base station.

B. Different paging search spaces are configured for the NR-lite users and other NR users, and only one of the following parameters in the corresponding paging search spaces is different.

Different CORESETs are configured for different users. For example, the CORESET #1 is configured for other NR users, and the CORESET #0 is configured for the NR-lite users.

Different PDCCH monitoring times, including: different monitoring periods, different time offsets in the monitoring period, monitoring modes in one slot, etc.

C. NR-lite users and other NR users use different preset CCE resource determination rules, or use different parameters in the preset CCE resource determination rules to obtain CCE resources corresponding to the paging search spaces. For example, other NR users still reuse the original rule, while the NR-lite users can add an offset of X on the basis of the original rule, as shown in expression (2). Alternatively, the NR-lite still uses the original CCE resource determination rule, that is, expression (1), but the value of $Y_{p,n_s,f}^{\mu}$ is no longer 0 and can be set to other values.

2. The aggregation degree configured for the paging PDCCH of NR-lite and/or the candidate transmission position of the corresponding PDCCH may be different.

3. Whether to use different paging PDCCHs for NR-lite users and other NR users can be configured by the base station or determined according to other conditions. For example, when the bandwidth of the initial BWP is equal to the bandwidth of CORESET #0, it can be defaulted that NR-lite users can use the same paging PDCCH with other NR users.

Figure 7:
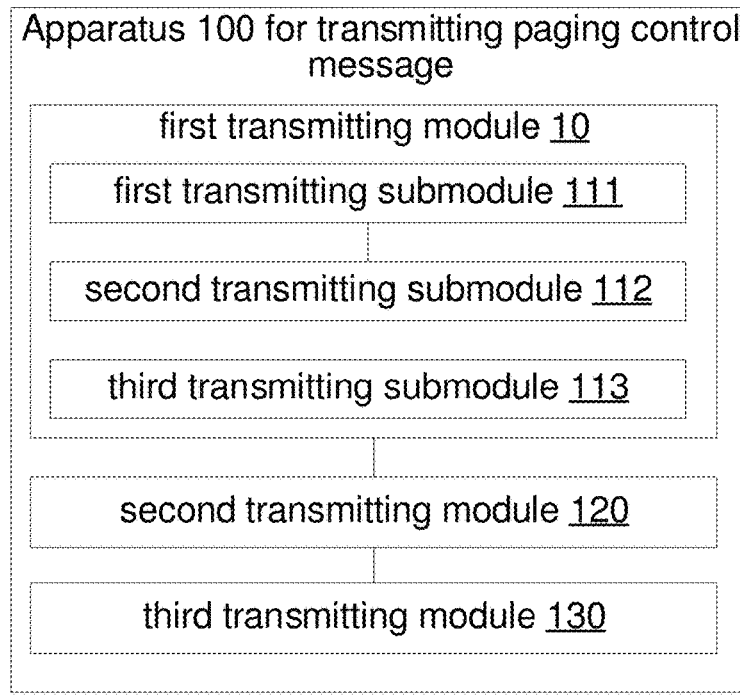
FIG. 7 is a block diagram illustrating an apparatus for transmitting a paging control message according to some embodiments.

Embodiment of the disclosure further provide an apparatus for transmitting a paging control message, applied to a base station. FIG. 7 is a schematic diagram illustrating compositions of an apparatus 100 for transmitting a paging control message according to some embodiments of the disclosure. As illustrated in FIG. 7, the apparatus 100 includes a first transmitting module 110.

The first transmitting module 110 is configured to transmit PDCCH signaling corresponding to a UE type of a UE according to the UE type. The PDCCH signaling carries a paging control message for the UE; and different UE types correspond to different PDCCH.

In some embodiments, the first transmitting module 110 includes a first transmitting submodule 111 configured to transmit the PDCCH signaling in a paging search space shared between different types of UEs. Scrambling sequences of different PDCCH signaling corresponding to different UE types are different, and the paging control message is configured to indicate scheduling information of a paging message.

In some embodiments, the scrambling sequence is a Paging Radio Network Temporary Identity (P-RNTI). P-RNTIs corresponding to different types of UEs are different.

In some embodiments, the first transmitting module 110 includes: a second transmitting submodule 112 configured to transmit the PDCCH in the paging search space of the PDCCH signaling corresponding to the UE type. Paging search spaces of different PDCCH signaling corresponding to different UE types are different.

In some embodiments, time domain resources of the paging search spaces of different PDCCH signaling corresponding to different UE types are different.

In some embodiments, periods of the paging search spaces of different PDCCH signaling corresponding to different UE types are different; or, periods of the paging search spaces of different PDCCH signaling corresponding to different UE types are the same, and time domain offsets in the periods of the paging search spaces of different PDCCH signaling corresponding to different UE types are different; or, transmission symbols in a single slot in the paging search spaces of different PDCCH signaling corresponding to different UE types are different.

In some embodiments, Control Resource Sets (CORESET) to which the paging search spaces of different PDCCH signaling corresponding to different UE types belong are different.

In some embodiments, the first transmitting module 110 includes: a third transmitting submodule 113 configured to transmit the PDCCH signaling on a candidate CCE resource determined according to a resource determination rule on a CORESET shared between different types of UEs. Resource determination rules corresponding to different UE types are different.

In some embodiments, rule parameters of the resource determination rules corresponding to different UE types are different.

The rule parameter includes an offset parameter and/or a randomization parameter.

In some embodiments, aggregation levels of PDCCH resources of different PDCCH signaling corresponding to different UE types are different; and/or, numbers of candidate transmission positions of the PDCCH resources of different PDCCH signaling corresponding to different UE types are different.

In some embodiments, the apparatus 100 further includes a second transmitting module 120 configured to carry the paging control message for a first type of UEs by adopting the PDCCH signaling of a second type of UEs in response to determining that a bandwidth of an initial BWP of the first type of UEs is equal to a bandwidth of CORESET #0.

In some embodiments, the apparatus 100 further includes: a third transmitting module 130 configured to transmit configuration signaling. The configuration signaling is configured to indicate that the paging control message for the first type of UE is carried by the PDCCH signaling of the first type of UEs or by the PDCCH signaling of the second type of UEs.

In some embodiments, the data transmission capabilities, and/or signal reception capabilities, and/or power consumptions of signal reception capabilities of different types of UEs are different.

Figure 8:
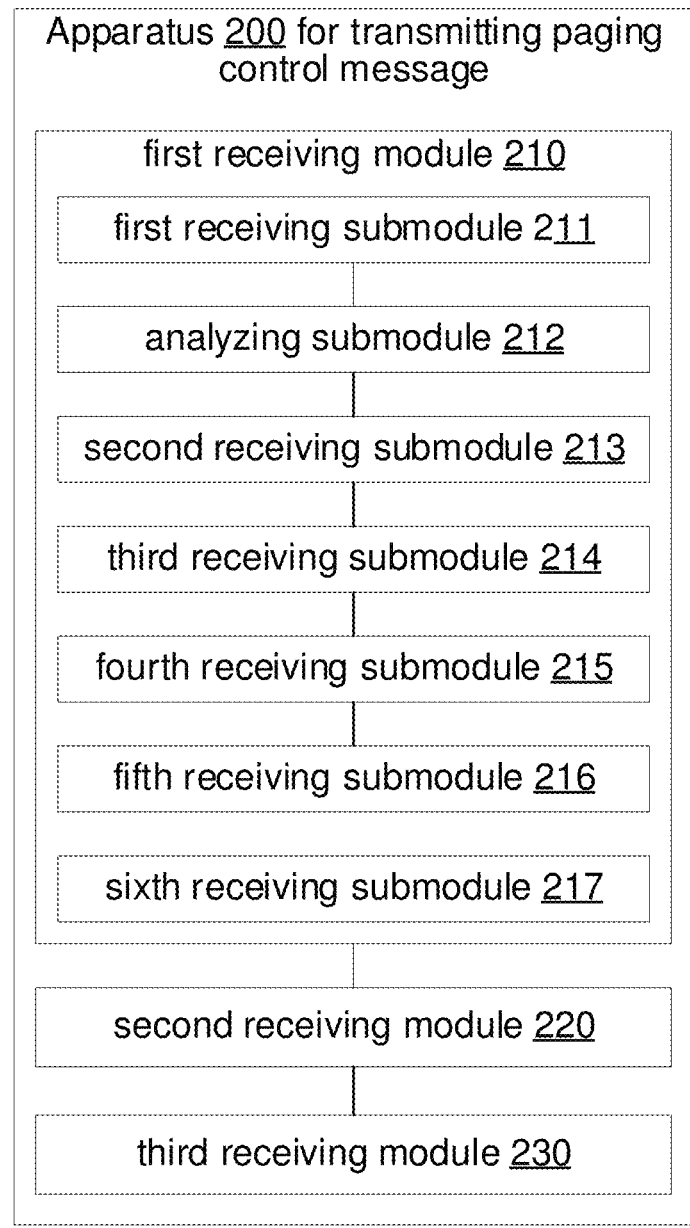
FIG. 8 is a block diagram illustrating another apparatus for transmitting a paging control message according to some embodiments.

Embodiments of the disclosure also provide an apparatus for transmitting a paging control message, applied to UE. FIG. 8 is a schematic diagram of compositions of an apparatus 200 for transmitting a paging control message according to embodiments of the disclosure. As illustrated in FIG. 8, The apparatus 200 includes: a first receiving module 210.

The first receiving module 210 is configured to receive PDCCH signaling by adopting a receiving parameter corresponding to a UE type of a UE. The PDCCH signaling carries a paging control message for paging the UE; different UE types correspond to different PDCCH signaling, and the paging control message is configured to indicate scheduling information of a paging message.

In some embodiments, the first receiving module 210 includes a first receiving submodule 211 configured to receive the PDCCH signaling in a paging search space shared between different types of UEs; and an analyzing submodule 212 configured to descramble the PDCCH signaling by adopting a descrambling sequence corresponding to the UE type. Scrambling sequences of different PDCCH signaling corresponding to different UE types are different.

In some embodiments, the descrambling sequence is a Paging Radio Network Temporary Identity (P-RNTI). P-RNTIs corresponding to different types of UEs are different.

In some embodiments, the receiving parameter includes a resource parameter.

The first receiving module 210 includes a second receiving submodule 213 configured to receive the PDCCH signaling in the paging search space of the PDCCH signaling corresponding to the UE type by adopting a resource parameter corresponding to the UE type. Paging search spaces of different PDCCH signaling corresponding to different UE types are different.

In some embodiments, the receiving parameter includes a time domain resource parameter.

The first receiving module 210 includes a third receiving submodule 214 configured to receive the PDCCH signaling in a time domain to which the paging search space of the PDCCH signaling corresponding to the UE type belongs by adopting the time domain resource parameter corresponding to the UE type. Time domains to which the paging search spaces corresponding to different UE types are different.

In some embodiments, the time domain resource parameter includes one of the following: a period of the paging search space of the PDCCH signaling corresponding to the UE type; a time domain offset in the period of the paging search space of the PDCCH signaling corresponding to the UE type; or transmission symbols in a single slot in the paging search space of the PDCCH signaling corresponding to the UE type.

In some embodiments, the receiving parameter includes: a Control Resource Set (CORESET) parameter.

The first receiving module 210 includes a fourth receiving submodule 215 configured to receive the PDCCH signaling on the CORESET to which the paging search space of the PDCCH signaling corresponding to the UE type belongs. The CORESETs to which the paging search spaces of the PDCCH signaling corresponding to different UE types belong are different.

In some embodiments, the receiving parameter includes a rule parameter of a resource determination rule.

The first receiving module 210 includes a fifth receiving submodule 216 configured to receive the PDCCH signaling on a candidate CCE resource determined according to the resource determination rule of the PDCCH signaling corresponding to the UE type. Resource determination rules corresponding to different UE types are different.

In some embodiments, the rule parameters of the resource determination rules corresponding to different UE types are different.

The rule parameter includes an offset parameter and/or a randomization parameter.

In some embodiments, the receiving parameter includes a PDCCH resource parameter.

The first receiving module 210 includes a sixth receiving submodule 217 configured to receive the PDCCH signaling on the PDCCH resource of the PDCH signaling by adopting the PDCCH resource parameter of the PDCCH signaling corresponding to the UE type. The PDCCH resources of different PDCCH signaling corresponding to different UE types are different.

In some embodiments, the PDCCH resource parameter includes one of the following: an aggregation level of the PDCCH resource of the PDCCH signaling; and/or, the number of candidate transmission positions of PDCCH resources of the PDCCH signaling.

In some embodiments, the apparatus 200 further includes a second receiving module 220 configured to, in response to determining that the UE is the first type of UE, receive the paging control message for the first type of UEs carried by the PDCCH signaling of the second type of UEs and transmitted, in response to determining that the bandwidth of the initial BEP of the first type of UEs is equal to the bandwidth of CORESET #0, by the base station.

In some embodiments, the apparatus 200 further includes a third receiving module 230 configured to receive configuration signaling and carry the paging control message by the PDCCH signaling indicated by the configuration signaling.

In some embodiments, data transmission capabilities, and/or signal reception capabilities, and/or power consumptions of signal reception capabilities of different types of UEs are different.

In some examples, the first transmitting module 110, the second transmitting module 120, the third transmitting module 130, the first receiving module 210, the second receiving module 220, and the third receiving module 230 may be implemented as one or more Central Processing Units (CPUs), Graphics Processing Units (GPUs), baseband processors (BP), Application Specific Integrated Circuit (ASIC), DSP, Programmable Logic Device (PLD), Complex Programmable Logic Device (CPLD), Field-Programmable Gate Array (FPGA), general-purpose processors, controllers, Micro Controller Units (MCU), Microprocessor, or other electronic components, or implemented in combination with one or more radio frequency (RF) antennas to implement the foregoing method.

Figure 9:
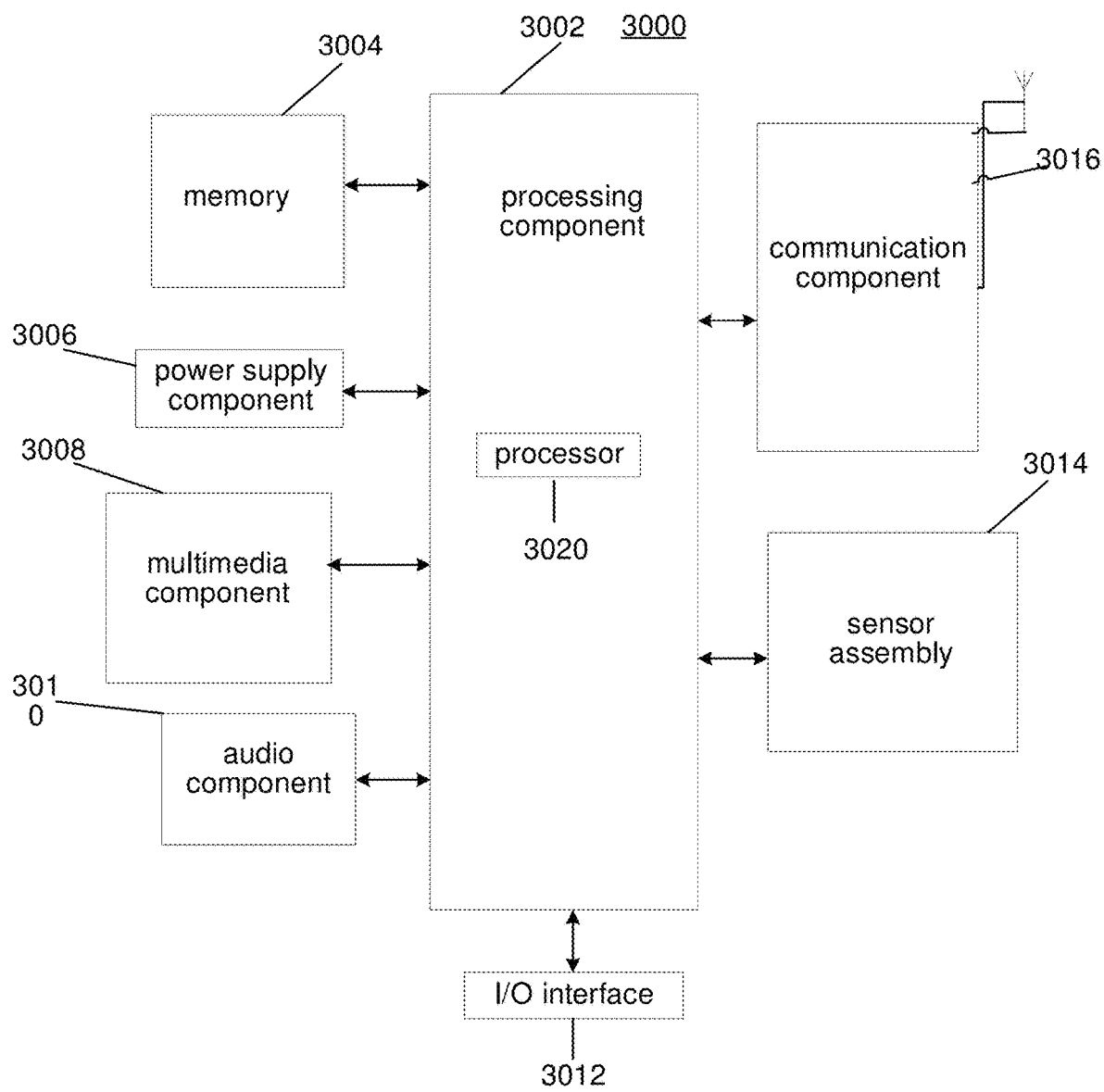
FIG. 9 is a block diagram illustrating a device for transmitting a paging control message according to some embodiments.

FIG. 9 is a block diagram illustrating a device 3000 for transmitting a paging control message according to some embodiments. For example, the device 3000 may be a mobile phone, a computer, a digital broadcasting terminal, a messaging device, a game console, a tablet device, a medical device, a fitness device, a personal digital assistant, etc.

As illustrated in FIG. 9, the device 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operations of the device 3000, such as operations associated with display, telephone calls, data communications, camera operations, and recording operations. The processing component 3002 may include one or more processors 3020 to execute instructions to complete all or part of the steps of the foregoing method. In addition, the processing component 3002 may include one or more modules to facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operations of the device 3000. Examples of these data include instructions for any application or method operating on the device 3000, contact data, phone book data, messages, pictures, videos, etc. The memory 3004 can be implemented by any type of volatile or non-volatile storage device or their combination, such as Static Random Access Memory (SRAM), Electrically Erasable Programmable Read Only Memory (EEPROM), Erasable and Programmable Read Only Memory (EPROM), Programmable Read Only Memory (PROM), Read Only Memory (ROM), Magnetic Memory, Flash Memory, Magnetic Disk or Optical Disk.

The power supply component 3006 provides power for various components of the device 3000. The power supply component 3006 may include a power management system, one or more power supplies, and other components associated with the generation, management, and distribution of power for the device 3000.

The multimedia component 3008 includes a screen that provides an output interface between the device 3000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 3008 includes a front-facing camera and/or a rear-facing camera. When the device 3000 is in an operation mode, such as a shooting mode or a video mode, the front-facing camera and/or the rear-facing camera can receive external multimedia data. Each of the front-facing cameras and rear-facing cameras can be a fixed optical lens system or have focal length and optical zoom capabilities.

The audio component 3010 is configured to output and/or input audio signals. For example, the audio component 3010 includes a microphone (MIC), and when the device 3000 is in an operation mode, such as a call mode, a recording mode, and a voice recognition mode, the MIC is configured to receive external audio signals. The received audio signal may be further stored in the memory 3004 or transmitted via the communication component 3016. In some embodiments, the audio component 3010 further includes a speaker for outputting audio signals.

The I/O interface 3012 provides an interface between the processing component 3002 and a peripheral interface module. The above-mentioned peripheral interface module may be a keyboard, a click wheel, a button, and the like. These buttons may include but are not limited to: home button, volume button, start button, and lock button.

The sensor component 3014 includes one or more sensors for providing the device 3000 with various aspects of status assessment. For example, the sensor component 3014 can detect the on/off status of the device 3000 and the relative positioning of components, such as the display and keypad of the device 3000. The sensor component 3014 can also detect the position change of the device 3000 or a component of the device 3000, the presence or absence of contact with the device 3000, the orientation or acceleration/deceleration of the device 3000, and the temperature change of the device 3000. The sensor component 3014 may include a proximity sensor configured to detect the presence of nearby objects when there is no physical contact. The sensor component 3014 may also include a light sensor, such as a CMOS or CCD image sensor, for use in imaging applications. In some embodiments, the sensor component 3014 may also include an acceleration sensor, a gyroscope sensor, a magnetic sensor, a pressure sensor or a temperature sensor.

The communication component 3016 is configured to facilitate wired or wireless communication between the device 3000 and other devices. The device 3000 can access a wireless network based on a communication standard, such as Wi-Fi, 2G or 3G, or a combination thereof. In some embodiments, the communication component 3016 receives a broadcast signal or broadcast related information from an external broadcast management system via a broadcast channel. In some embodiments, the communication component 3016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device 3000 may be implemented by one or more Application Specific Integrated Circuits (ASIC), Digital Signal Processors (DSP), Digital Signal Processing Devices (DSPD), Programmable Logic Devices (PLD), Field Programmable Gate Array (FPGA), controller, microcontroller, microprocessor, or other electronic component to implement the above method.

In some embodiments, there is also provided a non-transitory computer-readable storage medium including instructions, such as a memory 3004 including instructions, which may be executed by the processor 3020 of the device 3000 to complete the foregoing method. For example, the non-transitory computer-readable storage medium may be ROM, Random Access Memory (RAM), CD-ROM, magnetic tape, floppy disk, optical data storage device, etc.

After considering the specification and practicing the disclosure herein, those skilled in the art will easily think of other implementations of the embodiments of the disclosure. This application is intended to cover any variations, uses, or adaptive changes of the embodiments of the disclosure. These variations, uses, or adaptive changes follow the general principles of the embodiments of the disclosure and include those in the technical field that are not disclosed in the embodiments of the disclosure, common knowledge or conventional technical means. The description and the embodiments are only regarded as examples, and the true scope and spirit of the embodiments of the disclosure are pointed out by the following claims.

It is understandable that the embodiments of the disclosure are not limited to the precise structure that has been described above and shown in the drawings, and various modifications and changes can be made without departing from the scope thereof. The scope of the embodiments of the disclosure is only limited by the appended claims.

What is claimed is:

1. A method for transmitting a paging control message, performed by a base station, the method comprising:
    transmitting a Physical Downlink Control Channel (PDCCH) signaling corresponding to a user equipment (UE) type of a UE based on the UE type, wherein the PDCCH signaling carries a paging control message for the UE, different UE types correspond to different PDCCH signaling, and the paging control message is configured to indicate scheduling information of a paging message;
    wherein transmitting the PDCCH signaling corresponding to the UE type based on the UE type comprises: transmitting the PDCCH signaling on a candidate CCE resource determined based on a resource determination rule on a CORESET shared between different types of UEs;
    wherein resource determination rules corresponding to different UE types are different.

2. The method of claim 1, wherein transmitting the PDCCH signaling corresponding to the UE type based on the UE type comprises:
transmitting the PDCCH signaling in a paging search space of the PDCCH signaling corresponding to the UE type, wherein paging search spaces of different PDCCH signaling corresponding to different UE types are different.

3. The method of claim 2, wherein,
Control Resource Sets (CORESETs) to which the paging search spaces of different PDCCH signaling corresponding to different UE types belong are different.

4. The method of claim 1, wherein,
rule parameters of the resource determination rules corresponding to different UE types are different;
wherein the rule parameter comprises an offset parameter, or a randomization parameter, or both the offset parameter and the randomization parameter.

5. The method of claim 1, further comprising:
carrying the paging control message for a first type of UEs by adopting the PDCCH signaling corresponding to a second type of UEs in response to a bandwidth of an initial broadband part (BWP) of the first type of UEs being equal to a bandwidth of CORESET #0.

6. The method of claim 1, further comprising:
transmitting a configuration signaling, wherein the configuration signaling is configured to indicate that the paging control message for a first type of UEs is carried by the PDCCH signaling corresponding to the first type of UEs or the PDCCH signaling corresponding to a second type of UEs.

7. The method of claim 1, wherein,
different types of UEs have different data transmission capabilities, and/or different signal reception capabilities, and/or different power consumptions of signal reception capabilities.

8. A communication device, comprising a processor, a transceiver, a memory, and an executable program stored on the memory and capable of being run by the processor, wherein when the processor runs the executable program, the steps of the method for transmitting a paging control message of claim 1 are performed.

9. A method for transmitting a paging control message, performed by user equipment (UE), the method comprising:
receiving a Physical Downlink Control Channel (PDCCH) signaling by adopting a receiving parameter corresponding to a UE type of the UE; wherein the PDCCH signaling carries a paging control message for paging the UE; different UE types correspond to different PDCCH signaling, and the paging control message is configured to indicate scheduling information of a paging message;
wherein the receiving parameter comprises a rule parameter of a resource determination rule; wherein receiving the PDCCH signaling by adopting the receiving parameter corresponding to the UE type comprises: receiving the PDCCH signaling on a candidate CCE resource determined based on a resource determination rule of the PDCCH signaling corresponding to the UE type; wherein resource determination rules corresponding to different UE types are different.

10. The method of claim 9, wherein the receiving parameter comprises a resource parameter;
wherein receiving the PDCCH signaling by adopting the receiving parameter corresponding to the UE type comprises:
receiving the PDCCH signaling in a paging search space of the PDCCH signaling corresponding to the UE type by adopting the resource parameter corresponding to the UE type, wherein paging search spaces of different PDCCH signaling corresponding to different UE types are different.

11. The method of claim 10, wherein the receiving parameter comprises a Control Resource Set (CORESET) parameter;
wherein receiving the PDCCH signaling by adopting the receiving parameter corresponding to the UE type comprises:
receiving the PDCCH signaling on the CORESET to which the paging search space of the PDCCH signaling corresponding to the UE type belongs, wherein the CORESETs to which the paging search spaces of different PDCCH signaling corresponding to different UE types belong are different.

12. The method of claim 9, wherein,
rule parameters of the resource determination rules corresponding to different UE types are different;
wherein the rule parameter comprises an offset parameter, or a randomization parameter, or both the offset parameter and the randomization parameter.

13. The method of claim 9, further comprising:
in response to the UE type of the UE being a first type, receiving the paging control message for a first type of UEs carried by the PDCCH signaling corresponding to a second type of UEs and transmitted, in response to a bandwidth of an initial bandwidth part (BWP) of the first type of UEs being equal to a bandwidth of CORESET #0, by a base station.

14. The method of claim 9, further comprising:
receiving configuration signaling and carrying the paging control message by the PDCCH signaling indicated by the configuration signaling.

15. The method of claim 9, wherein,
different types of UEs have different data transmission capabilities, and/or different signal reception capabilities, and/or different power consumptions of signal reception capabilities.

16. A communication device, comprising a processor, a transceiver, a memory, and an executable program stored on the memory and capable of being run by the processor, wherein when the processor runs the executable program, the processor is configured to:
receive a Physical Downlink Control Channel (PDCCH) signaling by adopting a receiving parameter corresponding to a UE type of a UE; wherein the PDCCH signaling carries a paging control message for paging the UE; different UE types correspond to different PDCCH signaling, and the paging control message is configured to indicate scheduling information of a paging message;
wherein the receiving parameter comprises a rule parameter of a resource determination rule; wherein receiving the PDCCH signaling by adopting the receiving parameter corresponding to the UE type comprises: receiving the PDCCH signaling on a candidate CCE resource determined based on a resource determination rule of the PDCCH signaling corresponding to the UE type; wherein resource determination rules corresponding to different UE types are different.

* * * * *